United States Patent
Basic et al.

(10) Patent No.: US 10,224,830 B2
(45) Date of Patent: Mar. 5, 2019

(54) SYSTEM AND METHOD FOR CONTROLLING A BACK-TO-BACK THREE-LEVEL CONVERTER WITH VOLTAGE RIPPLE COMPENSATION

(71) Applicant: GE Energy Power Conversion Technology Limited, Rugby, Warwickshire (GB)

(72) Inventors: Duro Basic, Berlin (DE); Kai Alexander Rothenhagen, Berlin (DE); Niels Weitendorf, Postam (DE)

(73) Assignee: GE ENERGY POWER CONVERSION TECHNOLOGY LIMITED, Rugby (GB)

( * ) Notice: Subject to any disclaimer, the term of this patent is extended or adjusted under 35 U.S.C. 154(b) by 0 days.

(21) Appl. No.: 15/958,381

(22) Filed: Apr. 20, 2018

(65) Prior Publication Data
US 2018/0309379 A1 Oct. 25, 2018

(30) Foreign Application Priority Data

Apr. 21, 2017 (EP) ..................................... 17167589

(51) Int. Cl.
*H02M 5/458* (2006.01)
*H02M 1/14* (2006.01)
*H02M 7/487* (2007.01)

(52) U.S. Cl.
CPC ........... *H02M 5/458* (2013.01); *H02M 1/143* (2013.01); *H02M 7/487* (2013.01)

(58) Field of Classification Search
None
See application file for complete search history.

(56) References Cited

U.S. PATENT DOCUMENTS 7,528,505 B2   5/2009   Ritter et al.
8,441,820 B2   5/2013   Shen et al.
(Continued)

OTHER PUBLICATIONS

Ogasawara, S. and Akagi, H., Analysis of Variations of Neutral Potential in Neutral-Point-Clamped Voltage Source PWM Inverters, IAE Annual Meeting on 28th IEEE Industry Applications Conference, pp. 965-970 (1993).

(Continued)

*Primary Examiner* — Jeffrey A Gblende
(74) *Attorney, Agent, or Firm* — GE Global Patent Operation; Scott R. Stanley

(57) ABSTRACT

A method for controlling a back-to-back three-phase three-level converter having a grid-side AC/DC converter and a machine-side DC/AC converter connected by a split DC link which defines a DC link midpoint. The method includes controlling the grid-side converter to convert AC power from a grid into DC power of the DC link, controlling the machine-side converter to convert DC power from the DC link to AC power to feed a low frequency machine, and concurrently performing common mode voltage injection for the machine-side converter so as to at least partially compensate midpoint voltage ripple caused by the machine-side converter. The method further includes performing common mode voltage injection for the grid-side converter so as to at least partly further compensate the portion of the midpoint voltage ripple which remains uncompensated by controlling the machine-side converter. A control system implementing the control method and a power conversion system utilizing same.

15 Claims, 6 Drawing Sheets

(56) References Cited

U.S. PATENT DOCUMENTS

| | | | |
|---|---|---|---|
| 9,071,084 B2 | 6/2015 | Yang et al. | |
| 2013/0148397 A1* | 6/2013 | Schroeder | H02M 7/487 363/132 |
| 2013/0163292 A1* | 6/2013 | Basic | H02M 5/4585 363/34 |
| 2015/0008750 A1* | 1/2015 | Shen | H02M 7/487 307/82 |
| 2016/0329805 A1* | 11/2016 | Ghosh | H02M 1/15 |

OTHER PUBLICATIONS

Shen J., et al., "A Neutral-Point Balancing Controller for a Three-Level Inverter Full Power-Factor Range and Low Distortion", IEEE Transactions on Industry Applications, vol. 49, Issue. 1, pp. 138-148 (2011) (Abstract).

Wang C. and Li Y., "A New Balancing Algorithm of Neutral-Point Potential in the Three-Level NPC Converters", IEEE Industry Applications Society Annual Meeting, pp. 1-3 (Oct. 5-9, 2008) (Abstract).

* cited by examiner

SYSTEM AND METHOD FOR CONTROLLING A BACK-TO-BACK THREE-LEVEL CONVERTER WITH VOLTAGE RIPPLE COMPENSATION

FIELD OF THE INVENTION

Embodiments of the invention relate generally to the control of neutral point connected three-level back-to-back voltage source converters, such as three-level back-to-back Neutral Point Clamped (NPC) or Neutral Point Piloted (NPP) converters. More precisely, embodiments of the present invention relate to a control method and system for such converters to provide for active compensation of variations of the DC bus capacitor midpoint voltage in so called low frequency applications where the load-side DC/AC (direct current/alternating current) converter is operated at relatively low output frequencies and high modulation indexes.

BACKGROUND OF THE INVENTION

Three- or multi-level NPC and NPP power converters are widely used in many different power conversion applications such as, but not limited to wind and solar converters, power supplies, and variable speed drives, including high power medium voltage low speed machines and Doubly Fed Induction Machines (DFIM). An NPC converter typically includes three phase legs and a DC bus capacitor bank comprising at least two series connected DC bus capacitors. Each phase leg is composed of four series connected switches and each switch has an antiparallel freewheeling diode. Two additional diodes, so-called clamping diodes, are connected between the leg and a DC bus midpoint. The NPP converter topology is substantially similar to the NPC topology, but the output converter phases are connected to the DC bus midpoint by an internal bi-directional switch instead of the clamping diodes. Three-level NPC or NPP converters have many advantages, including good utilization of the semiconductor switches and low distortion of the output voltage.

In the 3-Level NPC and NPP converter topologies the splitting of the DC bus capacitor bank into two capacitor sub-banks provides an intermediate voltage step (midpoint or neutral point) for the 3 step modulation of the output phase voltages, i.e. via switching between the positive or negative DC bus rails and the capacitor midpoint. An inherent property of the NPC and NPP topologies, however, is that the resultant capacitor midpoint current, which ideally has a zero average, in addition to high switching ripples, contains a significant low frequency content or ripples. This low frequency midpoint current drives differences between voltages of the upper and lower DC bus capacitors causing capacitor midpoint voltage variations which may affect operation of the converter.

The capacitor midpoint current has a variable peak or rms value and waveform shape depending on the converter current and its phase shift with respect to phase voltage, i.e. the power factor. It is dominated by its fundamental frequency found at 3 times the converter output frequency and is thus often also called "$3^{rd}$ harmonic midpoint current injection". In addition to the $3^{rd}$ harmonic current injection, due to various system asymmetries, the capacitor midpoint current may have some small non-zero average DC value which is source of a drift of average value of the capacitor midpoint voltage.

In practical applications, two 3-level NPC or NPP converters are often connected in so called back-to-back topology to allow indirect AC/AC (grid frequency input/variable frequency output) conversion with intermediate DC link stage, i.e. an AC/DC/AC conversion. In this topology one of the converters is connected to the power grid-side and forms grid-side AC/DC conversion stage which is operated at constant frequency of typically 50 Hz/60 Hz to control the grid currents and exchange power between the grid and DC link. The other converter is connected to a load, such as a three-phase machine and forms the load- or machine-side DC/AC conversion stage to control the machine currents and exchange power between the DC bus and machine. To allow power transfer via the DC link, the grid-side and machine-side stages must be interconnected (back to back) via the positive and negative dc bus rails with or without interconnection of the capacitor midpoints. It may be more advantageous to interconnect the capacitor midpoints of the grid and machine-side converter stages to stiffen up the capacitor midpoint potential.

The midpoint current and associated dynamic voltage ripple and static drift of the midpoint voltage are source of several significant effects which have to be considered in the NPC converter design. These effects include an increased voltage and current stress of the DC bus capacitors, increased losses in the capacitors, and reduced capacitor life time. Excessive midpoint voltage variations may increase stress of semiconductor switching devices and may cause activation of DC brake choppers or protective overvoltage converter trips.

The capacitor midpoint voltage ripple is an extremely important issue in applications of the 3L NPC/NPP converters for stator current control of high power medium voltage low speed machines or rotor currents in Doubly Fed Induction Machines (DFIM). In these applications the machine/rotor side converter can be operated at nearly full modulation depths at very low nominal frequencies, e.g. 3 Hz-5 Hz. In such operational conditions the midpoint current produced by the machine-side converter, which is dominated by the 3rd harmonic component, has a relatively low frequency, e.g. 9 Hz-15 Hz. Therefore, the capacitor midpoint voltage ripple created by the machine-side converter can be an order of magnitude higher than that created by the grid-side converter operated at 50 Hz/60 Hz nominal frequency, i.e. a midpoint current injection at 150 Hz/160 Hz. In order to keep the capacitor midpoint voltage ripple or oscillations within a tolerable level in all operational conditions, there are two basic options: passive means by using large DC bus capacitors and/or active means based on direct or indirect midpoint current control.

In low frequency machine applications the passive control of the DC midpoint voltage ripple requires a substantial increase of the DC bus capacitance which has strong cost and space implications. In the back-to-back converter topologies the capacitor midpoint voltage ripple in the machine-side converter can be partially passively reduced if the capacitor midpoints of the grid- and machine-side converters are interconnected. But in critical low speed applications the residual midpoint voltage ripple may still be excessive and further increase of DC bus capacitance is normally required.

To reduce the size of the DC bus capacitors in low frequency applications it is extremely advantageous to maximize utilization of the active means to reduce the capacitor midpoint voltage ripple. For example, it is well known that it is possible to eliminate or reduce the capacitor midpoint current injection in 3-level NPC/NPP converters in an active way via injection of common mode voltage into converter voltage references. Such active compensation algorithms are typically designed to control common mode voltage inserted into the converter voltage references with the goal to stabilize static drift of the average value of the midpoint capacitor voltage and to reduce its ripple which is associated with the converter own midpoint current injection. The static midpoint voltage drift and the converter midpoint current ripple can be fully compensated in this way only in the operational points where the power factor is high and when a sufficient modulation margin is available. Unfortunately in the most critical operational points of the machine-side converter the modulation margin may be relatively low so that the midpoint current injected by the machine-side converter may only be marginally compensated.

The most direct way to control the DC bus capacitor midpoint potential is to connect the capacitor midpoint to the supply neutral point, e.g. via a direct connection, as disclosed in U.S. Pat. No. 7,528,505 B2, for example. The advantage of this solutions is that a very effective capacitor mid-point voltage control can be achieved in practically all operational points. However, this solution relies on passive mechanisms and is effective mainly in prevention of drifts of average value of the capacitor midpoint voltage. Moreover, as the neutral current path is lightly damped, this can potentially lead to instabilities. A disadvantage of this solution is also that the converter input inductor must not be a three-phase magnetically coupled inductor. The input inductor must be composed of three independent single-phase inductors.

Alternatively, if a three-phase magnetically coupled inductor is used an additional inductor has to be inserted between the grid and converter neutral points. An example of such solution is presented in US 2013/0163292 A1, where the DC bus midpoint is connected to a grid transformer neutral via an inductor and an additional active control of the neutral point current is used to actively control the capacitor midpoint voltage. But regardless of effectiveness of both solutions, major disadvantages are that additional passive components and access to the grid transformer neutral point are required.

The midpoint voltage can also be controlled in an active way using the converter Pulse Width Modulation (PWM). The basic advantage of this solution is that there is no need for additional passive components. A common approach is to utilize controlled injection of the common mode voltage into the converter voltage references. In this way it is possible to alter the midpoint current injected by the converter without affecting the converter line-line voltages and introducing unwanted distortion into the converter phase currents. From U.S. Pat. No. 8,441,820 B2, for example, it is known that it is possible to find bilateral functional relationships between the converter midpoint current and the injected common mode voltage. This allows to shape the common mode voltage injection to control instantaneous value of the midpoint current injection for capacitor midpoint voltage control.

In the state of the art solutions, injection of the common mode voltage is performed with the goal to compensate either average drift and/or ripple in the midpoint voltage produced by the converter itself. U.S. Pat. No. 9,071,084 B2 discloses a back-to-back 3-level NPC converter with interconnected capacitor midpoint, where control of average midpoint voltage drift is shared between the grid- and machine-side converters depending on available modulation margins of the converters. Compensation of low frequency ripples caused by the machine-side converter is not achieved and not intended.

It is an object of embodiments of the invention to improve performance of the capacitor midpoint variation compensation in back-to-back 3-level converter topologies with interconnected capacitor midpoints in low frequency applications. In particular, it is an object of embodiments of the present invention to provide a control method and system for such converter topologies, which greatly facilitate compensation of capacitor midpoint variations, including the dominating 3rd harmonic ripples caused by the machine-side converter. Another object of embodiments of the invention is to provide a power conversion system based on back-to-back 3-level converter topologies with interconnected capacitor midpoints and having capabilities for efficient compensation of capacitor midpoint drifts and low frequency ripples.

To solve this object, embodiments of the present invention provide the control method having the features of independent claim 1, the control system of claim 11 and the power conversion system of claim 15. Embodiments of the present invention are subject-matter of the dependent claims.

BRIEF DESCRIPTION OF THE INVENTION

In one aspect, a method for controlling a back-to-back three-phase three-level converter having a grid-side alternating current (AC) to direct current (DC) converter and a machine-side DC/AC converter connected by a split DC link which defines a DC link midpoint is provided. The method comprises controlling the grid-side converter to convert AC power from a grid into DC power of the DC link, including a positive, a negative, and a neutral voltage potential, the neutral potential being at the DC link midpoint. The method further comprises controlling the machine-side converter to convert DC power from the DC link to AC power to be output to a machine. The controlling the machine-side converter is adapted to perform common mode voltage injection for the machine-side converter so as to at least partially compensate midpoint voltage ripple caused by the machine-side converter. The method further comprises determining the instantaneous value of the midpoint current of the machine-side converter-which is uncompensated, i.e. will not or cannot be compensated, by controlling the machine-side converter, wherein the controlling the grid-side converter is adapted to perform common mode voltage injection for the grid-side converter based on the determined uncompensated value of the midpoint current of the machine-side converter so as to at least partly further compensate the uncompensated portion of the midpoint current, which is uncompensated by controlling the machine-side converter.

Embodiments of the invention thus provide for active compensation of low frequency ripple caused by the machine-side converter by employing both converters, i.e. the machine-side converter with help of the grid-side converter. This greatly improves performance of the capacitor midpoint ripple control in back-back 3-Level NPC or NPP converters with interconnected capacitor midpoints in low frequency applications by maximizing compensation of the midpoint voltage ripple via full utilization of entire available modulation margins of both converters. In the back-to-back converter topologies the capacitor midpoint voltage ripple current produced by the grid-side converter is significantly less pronounced compared to that that produced by the machine-side converter due to its significantly higher frequency and possibly due to higher power factors of the grid-side converter. This is particularly the case in low frequency applications. It has been found that in such situations it is advantageous to utilize the grid-side converter as a controlled midpoint current source which is employed to compensate for at least a part of the midpoint current injected by the machine-side converter if it cannot be fully compensated by the control of the machine-side control. The control approach of embodiments of the present invention enables effective utilization of the grid-side converter to cooperate with the machine-side converter in compensation of its midpoint current injection. This is achieved in a purely active way, without requiring any connection and impedances between the grid neutral and the DC link midpoints.

In the method mentioned above, the back-to-back converter is, in an embodiment, configured for low frequency applications, wherein the grid-side converter may be controlled to operate at a constant grid frequency of 50 Hz or 60 Hz, for example, while the machine-side converter may be controlled to operate at nearly full modulation depths at nominal frequencies below 10 Hz, for example, more particularly at 3-5 Hz. The midpoint voltage ripple may then be dominated by the $3^{rd}$ harmonic component of the operating frequency of the machine-side converter at 9-15 Hz, for example.

Controlling the machine-side converter may comprise dynamically calculating, in an actual operational point, the natural converter midpoint current injection, i.e. that produced with no additional common mode voltage injection, mapping a functional relationship between the midpoint current and common mode voltage injections, and calculating a reference for the capacitor midpoint current for the machine-side converter for use in its control using the pre-calculated map.

In some advantageous embodiments, calculating a reference for the capacitor midpoint current may comprise calculating a first part of the midpoint current reference of the machine-side converter, which can be select between natural and, in an embodiment, minimum practically realizable midpoint current values and which can be used for feedforward control of the machine-side converter, for example. The midpoint current injection produced by the machine-side converter which will not or cannot be compensated by the machine-side converter may then be used as an external reference for the grid-side converter.

The method may optionally further comprise calculating a second part of reference for the capacitor midpoint current of the machine-side converter for compensating an average value of the midpoint voltage drift which can, in an embodiment, be done using a feedback based control. Then a composite reference for the capacitor midpoint current for the machine-side converter to be used for its control may be calculated.

In any above-mentioned method it may be advantageous to determine limits within which the converter midpoint current injection can be controlled via available range of the common mode voltage injection in the machine-side converter and to limit the reference or the composite reference for the capacitor midpoint current for the machine-side converter to stay between the pre-calculated limits and to calculate a reference for the common mode voltage injection for the machine-side converter based on the limited reference or the composite reference for the capacitor midpoint current using the pre-calculated map. In this way it is ensured that the converter voltage references after the common mode injection will not saturate the PWM modulator and create converter output voltage and current distortions.

In embodiments of any method mentioned above, the uncompensated portion of the midpoint current produced by the machine-side converter may be scaled by a factor between 0 and 1, inverted in sign and used as external reference for the control of the grid-side converter. A feedforward compensation of the midpoint current by controlling the grid-side converter can then be performed taking this external reference into account.

In the method of any type mentioned above, controlling the grid-side converter may in particular comprise dynamically calculating, in actual operational point, the natural converter midpoint current injection, mapping a functional relationship between the midpoint current and common mode voltage injection, and calculating a first part of the midpoint current reference for feedforward control of the grid-side converter which is, in an embodiment, set to the natural midpoint current. This means that then no self-compensation is performed by control of the grid-side converter, since the midpoint current injection produced by the grid-side converter is not normally of concern in here relevant applications. The same effect may be achieved if the grid-side converter is controlled to provide a zero mode common mode voltage injection In addition, the method mentioned before may further comprise calculating a second part of references for the capacitor midpoint current of the grid side and machine-side converters for compensation of the average value of the common midpoint voltage drift, in an embodiment, using a feedback based control, and calculating a composite reference for the capacitor midpoint current for the grid-side converter, including the external reference indicating a scaled uncompensated portion of the midpoint current produced by the machine-side converter, for compensation of the midpoint current produced by the machine-side converter. If the feedback control is used in both the converters, the integral part of the feedback controllers should be, in an embodiment, enabled only in one converter either on machine- or on grid-side.

In an embodiment, controlling the grid-side converter may further comprise determining limits within which the converter midpoint current injection can be controlled via available range of the common mode voltage injection in the grid-side converter, limiting the composite reference to stay between the determined limits, and calculating the common mode voltage injection for the grid-side converter based on the limited composite reference using the pre-calculated map.

In embodiments of the invention, low frequency midpoint voltage ripples may be effectively compensated by feedforward control of both the grid-side and machine-side converters, and midpoint average voltage drifts may be compensated by feedback control of at least one of the grid-side and machine-side converters.

In another aspect, a system for controlling a back-to-back three-phase three-level converter having a grid-side alternating current (AC) to direct current (DC) converter and a machine-side DC/AC converter connected by a split DC link which defines a DC link midpoint is provided. The system comprises a first controller for controlling the grid-side converter to convert AC power from the grid into DC power of the DC link including a positive, a negative, and a neutral voltage potential, said neutral potential being at the DC link midpoint. The system further comprises a second controller for controlling the machine-side converter to convert DC power from the DC link to AC power to be output to a machine. The system further comprises at least one control unit configured for performing common mode voltage injection for the machine-side converter so as to at least partially compensate midpoint voltage ripple caused by the machine-side converter, determining value of the midpoint current of the machine-side converter current which is uncompensated by controlling the machine-side converter, and performing common mode voltage injection for the grid-side converter based on the determined uncompensated value of the midpoint current of the machine-side converter so as to at least partly further compensate the portion of the midpoint current, which is uncompensated by controlling the machine-side converter.

The control system mentioned before may further comprise calculating means for calculating, in an actual operational point, midpoint current, its limits and required midpoint current and common mode voltage injections, and mapping means to provide a functional relationship between the midpoint current and common mode voltage injections.

In embodiments, any control system mentioned above may comprise feedforward control means for controlling the grid-side and machine-side converters to provide for feedforward compensation of the midpoint voltage ripple.

In addition, the control system may further comprise feedback control means for controlling at least one of the grid-side and machine-side converters to provide for feedback compensation of the average midpoint voltage drift. The feedback control means can also be configured to assist in the midpoint voltage ripple compensation if an increased bandwidth is used.

In still another aspect, a power conversion system is provided. The power conversion system comprises a three-phase three-level grid-side alternating current (AC) to direct current (DC) converter, a three-phase three-level machine-side DC/AC converter connected to the grid-side converter in a back-to-back configuration, a split DC link connecting the grid-side and machine-side converters and defining a DC link midpoint, and a controller for controlling operation of the power conversion system. The controller comprises a first controller for controlling the grid-side converter to convert AC power from the grid into DC power of the DC link, including a positive, a negative, and a neutral voltage potential, said neutral potential being at the DC link midpoint. The controller comprises a second controller for controlling the machine-side converter to convert DC power from the DC link to AC power to be output to a machine. The controller further comprises at least one control unit configured for performing common mode voltage injection for the machine-side converter so as to at least partially compensate midpoint voltage ripple caused by the machine-side converter, determining value of the midpoint current of the machine-side converter current which is uncompensated by controlling the machine-side converter, and performing common mode voltage injection for the grid-side converter based on the determined uncompensated value of the midpoint current of the machine-side converter so as to at least partly further compensate the portion of the midpoint voltage, which is uncompensated by controlling the machine-side converter.

Further embodiments of the control system and the power conversion system of embodiments of the present invention correspond to the embodiments of the inventive control method mentioned above and may be implemented as corresponding system components configured to perform the mentioned method steps. The corresponding embodiments of the control system and the power conversion system also benefit from the advantages of the above mentioned embodiments of the control method.

Further aspects, objects and advantages will be apparent from the following detailed description when taken in conjunction with the accompanying drawings, from the drawings as such or the following claims.

BRIEF DESCRIPTION OF THE DRAWINGS

The accompanying drawings, which are incorporated herein and constitute a part of the specification, illustrate embodiments of the invention and, together with the description, serve to explain the advantages and principles of the invention. Like reference numerals are used to refer to like elements throughout the drawings, wherein.

DETAILED DESCRIPTION

Figure 1:
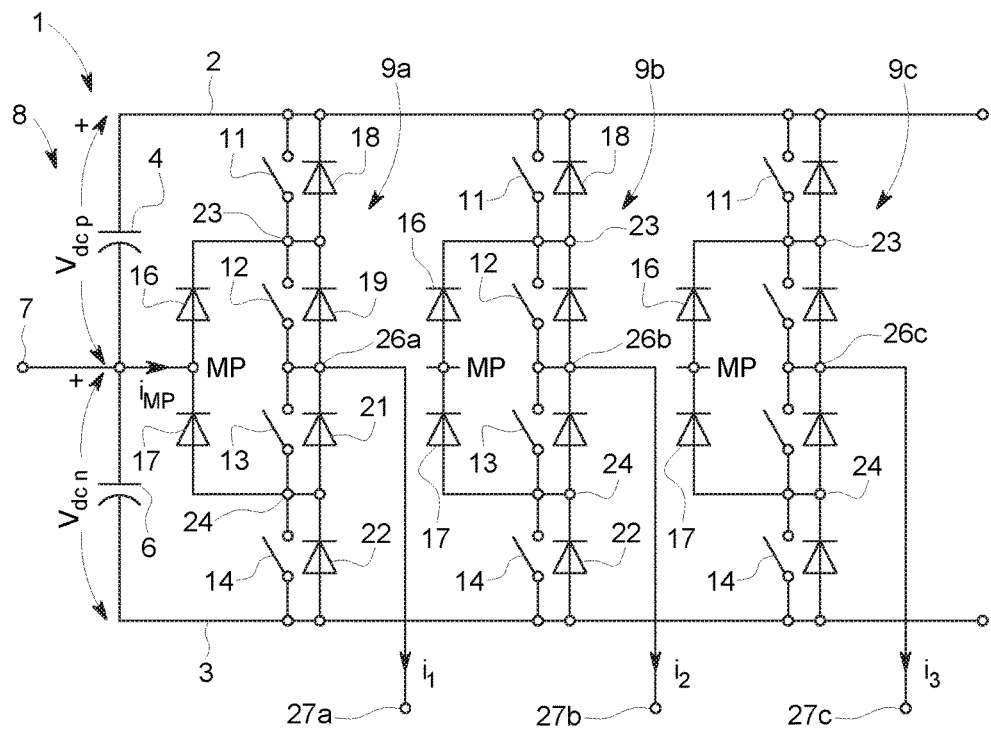
FIG. 1 shows a block diagram of a three-level Neutral Point Clamped (NPC) converter.

Referring to FIG. 1, an embodiment of a three-phase three-level Neutral Point Clamped (NPC) converter 1 is shown as an example for a three-phase three-level neutral point connected converter which can be used in an embodiment of the present invention. It will be understood that the NPC converter 1 as shown can be used in various motor drives, utility interface and power supply applications, including low frequency applications as described below, as a means for converting direct current (DC) to alternating current (AC) electrical power and vice versa. The NPP converter 1 comprises a first or positive rail 2, which can be connected to a positive pole of a DC power source (not shown) and a second or negative rail 3 which can be connected to a negative pole of the DC power source.

DC link capacitors (or capacitor sub-banks) 4 and 6 are connected in series with each other and between the positive and negative rails 2, 3. The capacitors 4, 6 define a DC neutral point or midpoint 7 therebetween, which is capable of accepting and storing either positive or negative charge. The midpoint 7 allows the converter to treat the DC input rails 2, 3 as if they were two equal DC sources connected in series defining three power nodes, i.e. a positive node, a negative node, and a neutral node of DC link 8. For optimal operation, the same magnitude of voltage should be present on each side of the neutral node or midpoint 7. That is, the midpoint voltage should be balanced and the same voltage magnitude should be present on each of the DC link capacitors 4 and 6.

The NPP converter 1 comprises three phase circuits or switching legs 9a, 9b, and 9c for phases a, b, and c, respectively. The phase legs 9a-c are connected in parallel with each other between the positive and negative rails 2, 3. The switching legs 9a-c all have the same configuration. Each switching leg 9a-c includes four switching devices 11, 12, 13 and 14 connected in series with each other between the positive and negative rails 2, 3 and two clamping diodes 16 and 17. Each switching device 11-14 is a controllable electronic switch which is, in an embodiment, a power semiconductor switch suitable for high power applications. More specifically, the switches 11-14 are designed as IGBTs (Insulated Gate Bipolar Transistors), but could also be other power semiconductors, such as field effect transistors, in particular MOSFETs, Gate Turn Offs (GTO) thyristors, IGC thyristors (IGCTs) and other comparable switchable electronic components. Herein, IGBT switches are, in an embodiment, used. A freewheeling diode 18, 19, 21, 22 is connected in antiparallel to each of the switches 11-14 in flow direction towards the positive rail 2.

A first clamping diode 16 is coupled in each leg 9a-c between DC link midpoint 7 and a connection point 23 between the upper two switches 11, 12, which are connected to the positive rail 2, in flow direction towards the connection point 23. A second clamping diode 17 is coupled between the connection point 24 between the lower two switches 13, 14, which are connected to the negative rail 3, and the midpoint 7 in flow direction toward the midpoint 7.

A connection point 26a, 26b, 26c between the middle two switches 12, 13 of each switching leg 9a-c in FIG. 1 forms a corresponding AC output terminal or node 27a, 27b, and 27c, respectively.

In operation, the capacitor voltages $V_{dcp}$ and $V_{dcn}$ are controlled to each have a voltage equal to $V_{DC}/2$, where $V_{DC}$ is the total DC link voltage. Voltages $v_a$, $v_b$, and $v_c$ are the phase output voltages measured with respect to the midpoint 7 of DC link 8. Switch 11 is complementary to switch 13 so that, when switch 11 is gated on, switch 13 is gated off and vice versa. Similarly, switches 12 and 14 are complementary. Each leg of the NPC three-level converter has three switching stages. In a first switching stage, switches 11 and 12 are turned on and switches 13 and 14 are turned off. Assuming a stable operation, $V_{dcp}=V_{dcn}=V_{dc}/2$, and considering phase a as an example, the phase output voltage $v_a$ becomes $V_{DC}/2$. In the second switching stage, switches 12 and 13 are turned on, while switches 11 and 14 are turned off. In this stage, $v_a$ is equal to 0. In the third switching stage, switches 11 and 12 are turned off whereas switches 13 and 14 are turned on. This results in $v_a$ becoming $-V_{dc}/2$. The same applies to phases b and c. Thus, the phase voltages $v_a$, $v_b$, and $v_c$ each have three levels $V_{dc}/2$, $-V_{dc}/2$, and 0. When all three legs of the NPC three-phase converter are combined, then the resulting line to line voltages have five levels, namely $V_{dc}$, $V_{dc}/2$, 0, $-V_{dc}/2$, and $-V_{dc}$.

Figure 2:
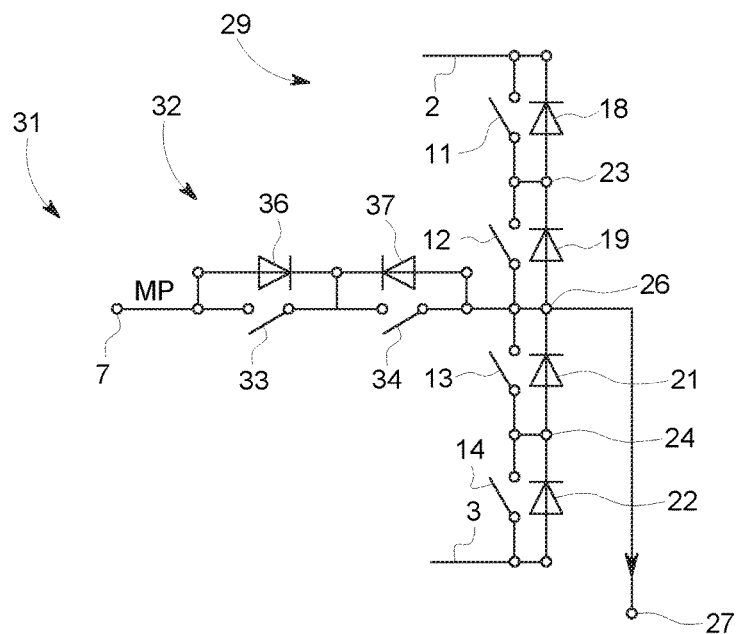
FIG. 2 shows a switching leg of a three-level Neutral Point Piloted (NPP) converter.

FIG. 2 shows a phase circuit or switching leg 29 of a three-level converter of the Neutral Point Piloted (NPP) typology. The switching leg 29 can be substituted for each of the legs 9a-c to result in a circuit diagram of a three-phase three-level NPP converter 1. In contrast to the NPC converter 1 shown in FIG. 1, each switching leg 29 of the NPP converter of FIG. 2 comprises an inner leg branch 31 which extends between the DC link midpoint 7 and the connection point 26a, 26b and 26c, respectively, which forms the AC output terminal 27a, 27b, and 27c. In FIG. 2 these points and terminals are designated only by 26 and 27, respectively.

The inner leg branch 31 comprises a bi-directional switch 32 disposed therein. In the configuration shown in FIG. 2, the bi-directional switch 32 is formed by a cascade of two switching devices or switches 33, 34 of more particularly the same type as the switches 11-14, which have a freewheeling diode 36, 37 connected in anti-parallel thereto. It will be understood that other configurations of a bi-directional switch generally known in the art could be used instead. Apart from the replacement of the clamping diodes in FIG. 1 by the inner leg branch 31 with the bi-directional switch 32 of FIG. 2, the structures and operations of the NPC and NPP converters are substantially similar, but the switches 33, 34 in the inner leg branch 31 need to be gated on in the second switching stage to allow midpoint current flow to and from the DC link midpoint 7.

Figure 3:
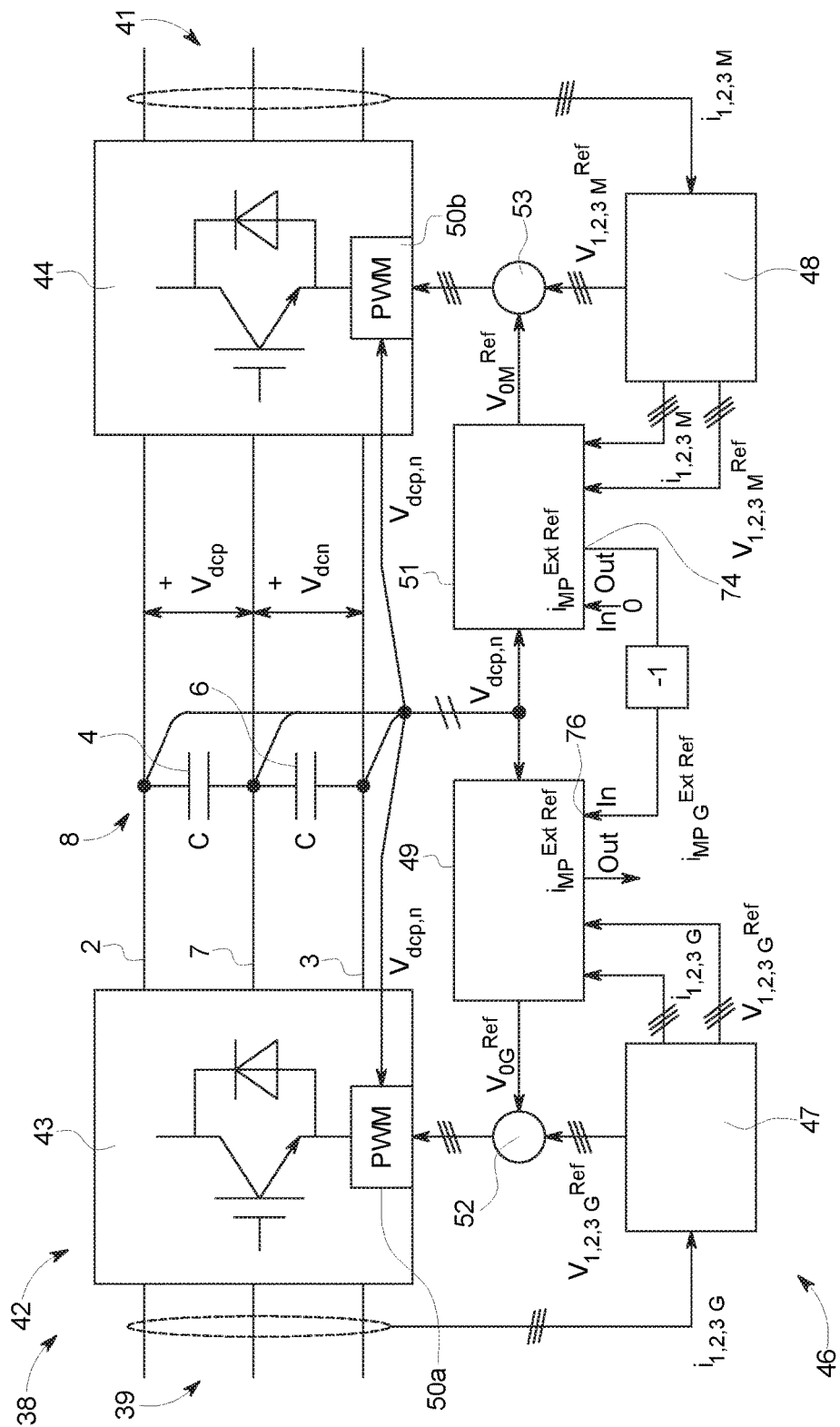
FIG. 3 illustrates a simplified block diagram of a power conversion system comprising a back-to-back three-phase three-level converter and means for controlling same for low frequency machine applications.
Figure 4:
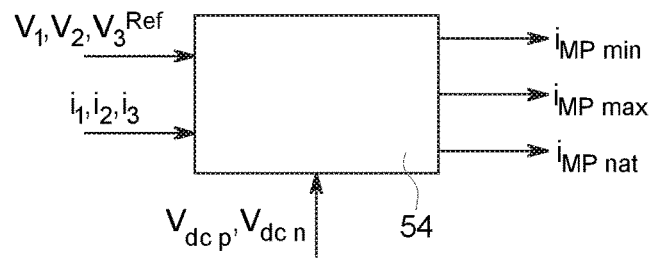
FIG. 4 shows a block for calculation of natural midpoint current and limits within which it can be controlled thereof for use in the power conversion system of FIG. 3, in a simplified schematic view.
Figure 5:
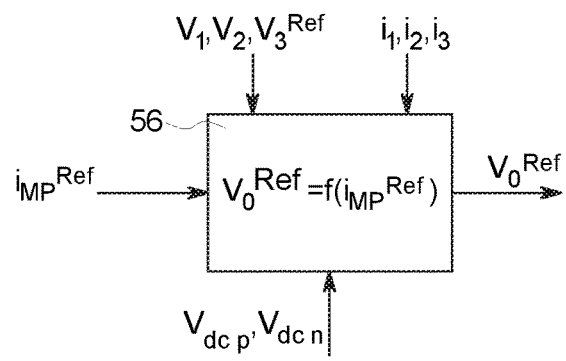
FIG. 5 shows a block for calculation of common voltage reference as a function of a midpoint current reference for use in the power conversion system of FIG. 3, in a simplified schematic view.

FIG. 3 shows a simplified block diagram of a power conversion system 38 according to an embodiment of the invention. The power conversion system 38 illustrates a system for converting AC power of a specified frequency from a grid indicated by reference numeral 39 in FIG. 3 into a lower nominal frequency of a low speed machine generally indicated by reference numeral 41 in FIG. 3.

As seen in FIG. 3, the power conversion system 38 comprises a back-to-back converter 42 which comprises a first or grid-side converter 43 and a second or machine-side converter 44 which can be of either of the three-phase three-level NPC and NPP topologies shown in FIGS. 1 and 2. The converters 43, 44 are connected in so called back-to-back topology via their DC links 8 to allow indirect AC/AC (grid frequency input/variable frequency output) conversion with intermediate DC link stage, i.e. an AC/DC/AC conversion. The first converter 43 is connected to the power grid-side to provide a grid-side AC/DC conversion stage operated at constant frequency of typically 50 Hz or 60 Hz to control the grid currents and power exchange between the grid 39 and the DC link 8. The second converter 44 is connected to the machine 41 and provides a machine-side DC/AC conversion stage for controlling the machine currents and power exchange between the DC bus 10 and the machine 41. To allow power transfer via the DC link 8, the grid-side and machine-side converter stages 43, 44 are interconnected back to back via the positive and negative DC link rails 2, 3 and their capacitor midpoints 7 are also interconnected with each other to stiffen up the midpoint potential. This is illustrated in FIG. 3 by the series connection of the DC link capacitors 4, 6 separately shown between the converters 43, 44. It will be understood that the DC link capacitors 4, 6 may each form a sub-assembly of a capacitor bank comprising a plurality of capacitors connected in series and/or in parallel to each other. It should further be noted that the power conversion system 38 of embodiments of the present invention, as exemplarily shown in FIG. 3, does not require and is free of an interconnection between the DC link capacitor midpoint 7 and a grid-side neutral point.

FIG. 1 further shows an exemplary control system 46 for controlling operation of the power conversion system 38.

The control system 46 comprises a plurality of control units indicated substantially by functional blocks 47-51 in FIG. 3. It will be understood that these control units may be implemented in hardware, software and/or firmware, as desired, and may be integrated into one controller or may distributed over various controllers communicatively interconnected with each other.

In the embodiment of FIG. 3, the control system 46 primarily comprises a controller 47 for controlling fundamental operation of the grid-side converter 43 and a controller 48 for controlling fundamental operation of the machine-side converter 44. Controllers 47, 48 generate voltage references for Pulse Width Modulation (PWM) generators 50a, 50b, for example, which produce PWM signals to gate terminals of the e.g. IGBT switches 11-14 and possibly 33, 34 of the converters 43, 44 to provide switching signals to the converter phase legs. The applied switching signals cause the switches of the converter legs 9a-c, 29a-c, 31 to switch in an appropriate manner to convert the AC power to DC power by the grid-side converter 43 and further to convert the DC power to AC power by the machine-side converter 44. This AC power drives the AC electric machine 41.

The grid-side converter controller 47 and the machine-side converter controller 48 are each connected to the grid 39 and the AC machine 41, respectively, for receiving measured variables during operation, including phase voltages and currents sensed at the grid-side and machine-side, respectively. The controllers 47, 48 generate converter voltage references $v_{1,2,3\ G}^{Ref}$ and $v_{1,2,3\ M}^{Ref}$, respectively, for the converter PWM control. The converter voltage references can be generated in open or closed loop manner based using the converter current control loop and the sensed grid-side or machine-side phase currents $i_{1,2,3\ G}$ and $i_{1,2,3\ M}$, respectively.

As may be further taken from FIG. 3, the control system 46 further comprises a midpoint voltage control unit 49 for the grid-side converter 43 and a midpoint voltage control unit 51 for the machine-side converter 44. The control units 49 and 51 are configured to control the midpoint voltage at the DC midpoint 7 in an active way using the voltage references for the PWM of the respective converter 42 and 43, respectively, by utilizing controlled injection of common mode voltage into the converter voltage references. To this end, each of the midpoint voltage control units 49 and 51 receives the positive and negative DC link voltages $V_{dcp,n}$ sensed from DC link 8 and further receives the sensed phase currents $i_{1,2,3\ G}$ and $i_{1,2,3\ M}$ as well as the respective converter voltage references $v_{1,2,3\ G}^{Ref}$ and $v_{1,2,3\ M}^{Ref}$ from the grid-side and machine-side converter controller 47 and 48, respectively. Depending on the type of PWM method used, these voltage references my contain common mode voltage injection performed by typical carrier based PWM (for example, the $3^{rd}$ harmonic injection). Based on the received measured variables, the control units 49 and 51 may calculate and provide common mode voltage references $v_{0G}^{Ref}$ and $v_{0M}^{Ref}$, respectively, which are summed with the converter voltage references $v_{1,2,3\ G}^{Ref}$ and $v_{1,2,3\ M}^{Ref}$ from the controllers 47 and 48, respectively, in summation units 52 and 53, respectively, to provide composite references. The composite references can be used for controlling operation of the grid-side and machine-side converters 43, 44 while compensating midpoint current drifts and ripples, as is described in more detail below.

As is generally known, a serious drawback of and challenge with the NPC and NPP topologies is that the resultant capacitor midpoint current $i_{MP}$, which should ideally have a zero average, contains significant low frequency content. The low frequency midpoint current drives a difference between voltages of the upper ($v_{dcp}$) and lower DC bus ($v_{dcn}$) capacitors 4, 6. The average value of the half bus voltages is called capacitor midpoint voltage:

$$v_{dc\,MP} = \frac{1}{2}(v_{dcp} - v_{dcn})$$

The capacitor midpoint voltage vdc MP is a measure of deviation of half DC bus voltages from ideal voltage equal to one half of the full DC bus voltage, i.e.:

$$v_{dcp} = \frac{v_{dc}}{2} + v_{dc\,MP}$$
$$v_{dcn} = \frac{v_{dc}}{2} - v_{dc\,MP}$$

The capacitor midpoint current $i_{MP}$ has a variable peak/rms value and waveform shape depending on the converter current and its phase shift with respect to phase voltage (power factor). It is dominated by its fundamental frequency found at three times the converter output frequency and may be called "the 3rd harmonic midpoint current injection". In addition to the 3rd harmonic current injection, due to various system asymmetries, the capacitor midpoint current $i_{MP}$ may have some small non-zero average (DC) value which is source of a drift of average value of the capacitor midpoint voltage $v_{dc\ MP}$. The capacitor midpoint voltage ripple and rate of change of the average midpoint voltage drift is inversely proportional to the effective midpoint capacitance (2C) of the DC bus. It is also inversely proportional to the frequency of the midpoint current ripple.

$$v_{dc\,MP} = \frac{1}{2C}\int i_{MP}dt$$

The midpoint current and associated dynamic voltage ripple or static drift of the midpoint voltage may overstress the DC link capacitors 4, 6 and switching devices 11-14, 33-34 and cause overvoltage or undervoltage trips during the operation of the converter. In applications of the three-level NPC/NPP converter 1 for stator current control of high power medium voltage low speed machines or rotor currents in doubly fed inductions machines, the midpoint current $i_{MP}$ produced by the machine-side converter 44, which is dominated by the third harmonic component, has a relatively low frequency of 9-15 Hz. Thus, the capacitor midpoint voltage ripple created by the machine-side converter 44 can be an order of magnitude higher than that created by the grid-side converter 43 operated at 50 Hz/60 Hz nominal frequency (midpoint current injection at 150 Hz/160 Hz).

Therefore, it is important to stabilize static drift of the average value of the midpoint capacitor voltage and to reduce its ripple, in particular in the case of low frequency applications. This is achieved by the midpoint voltage control units 49 and 51, which generally comprise the following basic functional blocks: (i) pre-calculation of midpoint current, its limits and required common mode injection in function of midpoint current, (ii) feedforward control, (iii) feedback control, and (iv) common mode voltage reference calculation. The internal structures and functions of these blocks are described in more detail below with additional reference to FIGS. 4 through 8.

Pre-Calculator of Midpoint Current and $v_0=f(i_{MP})$ Mapping

As is generally known from the art, the low frequency content of the midpoint current $i_{MP}$ injected by the 3-Level NPC/NPP converter 1 can be calculated in some operational point using measured converter phase currents $i_1$, $i_2$, $i_3$ and modulation indexes $m_1$, $m_2$, $m_3$:

$$i_{MP\ nat}=(1-ABS(m_1))i_1+(1-ABS(m_2))i_2+(1-ABS(m_3))i_3$$

where $(1-abs(m_i))$ represents portion of time in which converter output phase i ($=1, 2, 3$) is in average connected to the midpoint capacitor.

Only two current measurements are sufficient if no neutral conductor is used. The third current can then be reconstructed from the condition $i_1+i_2+i_3=0$. The modulation indexes for each phase, $m_i$, may be calculated from the converter voltage references, $v_i^{Ref}$, and half DC bus capacitor voltages $v_{dcp}$ and $v_{dcn}$ as follows:

$$m_i=v_i^{Ref}/v_{dcp},\text{ if }v_i^{Ref}>0$$

$$m_i=v_i^{Ref}/v_{dcn},\text{ if }v_i^{Ref}<0$$

In 3-level modulation, the modulation indexes $m_i$ can span a range between $-1$ to $1$. They are used in PWM to define turn on times of the converter switches relative to the switching period, i.e. duty cycles. A positive value means PWM switching between the positive DC bus rail 2 and the midpoint 7 and a negative value means PWM switching between the negative DC bus rail 3 and the midpoint 7.

As is generally known in the art, the modulation indexes $m_i$ and hence midpoint current injection can be altered via injection of a common mode voltage at the converter output frequency into the converter voltage references. In order to prevent saturation of PWM modulators and distortion of the converter line-line voltages ($|m_i|\le 1$), available range for the common mode voltage injection is limited and must be identified from the converter voltage references. Based on available range of the common mode voltage injection, the midpoint voltage control units 49, 51 can calculate possible limits for the midpoint current references $i_{MP\ min}$ and $i_{MP\ max}$ within which midpoint current can be controlled via common mode voltage injection using a control logic schematically shown by block 54 in FIG. 4 and also deduce mapping between the applicable common mode voltage injection and resulting midpoint current $v_0=f(i_{MP})$ as shown by logic block 56 in FIG. 5. If the midpoint current reference is set between the limits $i_{MP\ max}$ and $i_{MP\ min}$ the respective converter 43, 44 can be controlled to produce the requested midpoint current injection without exceeding the available modulation margins avoiding distortions of the converter output voltages. In other words, each converter 43, 44 can be considered and utilized as a controllable current source connected to the midpoint 7 which precisely follows the reference, i.e. $i_{MP}/i_{MP}^{Ref}=1$.

Capacitor Midpoint Voltage Control

Once the control unit 49, 51 has defined the function $v_0=f(i_{MP})$ in a particular operational point (see block 56 in FIG. 5), it can use the common mode voltage injection to alter or shape the midpoint current injection, similarly as with a voltage controlled current generator, to control the midpoint current $i_{MP}$ and related midpoint voltage variations.

In an embodiment, the midpoint current reference $i_{MP}^{Ref}$ will be synthetized for each converter using three components: (i) a feedforward control reference, (ii) a feedback control reference, and (iii) an external reference.

Feedforward Control

To achieve zero midpoint current injection, i.e. to fully remove the capacitor midpoint voltage ripple produced by a converter 43, 44 the midpoint current reference should be set to zero. However the midpoint current control range may be restricted by the converter operational point and not cover the zero point. Thus the lowest feedforward midpoint current reference which can be set may not be zero and is calculated in the following way, as indicated by logic block 57 in FIG. 6:

$$i_{MP\ min\ abs}=\text{MAX}(i_{MP\ min},0)+\text{MIN}(i_{MP\ max},0)$$

This current $i_{MP\ min\ abs}$ indicates the lowest possible absolute value of the midpoint current of the converter 43, 44 which is achievable by controlling the common mode voltage injection without creating distortion of the differential mode voltages. The current $i_{MP\ min\ abs}$ is shown in bold line in the time diagram shown in FIG. 6, while the natural midpoint current $i_{MP\ nat}$ is shown in solid line and the minimum and maximum limits for the midpoint current references $i_{MP\ min}$ and $i_{MP\ max}$ are shown as dash-dotted and dashed, respectively. It should be noted that it is not possible to reduce the absolute value of the capacitor midpoint current injection below the level defined by $i_{MP\ min\ abs}$.

Figure 6:
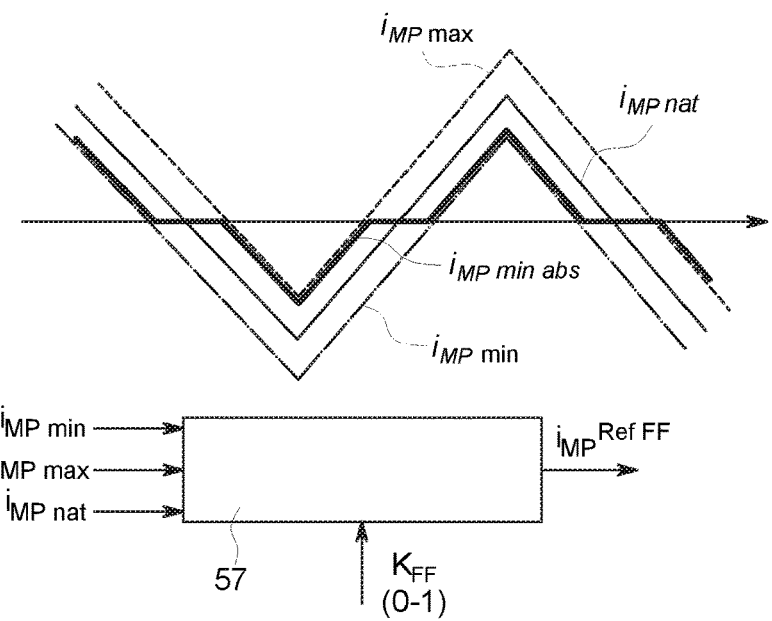
FIG. 6 shows time signals and a block for explaining the synthesis of feedforward reference for the capacitor midpoint current which is controllable by the converter for use in the power conversion system of FIG. 3, in a simplified view.

The control logic 57, as shown in FIG. 6, can then define a reference for the feedforward compensation, $i_{MP}^{Ref\ FF}$, for example by using a factor $K_{FF}$, which can take some value between 0 to 1, according to the following equation:

$$i_{MP}^{Ref\ FF}=(i_{MP\ nat}+K_{FF}(i_{MP\ min\ abs}-i_{MP\ nat}))$$

If the feedforward compensation factor is set $K_{FF}=0$, the midpoint current reference $i_{MP}^{Ref\ FF}$ is set to the natural midpoint current $i_{MP\ nat}$ and the resulting effect would be a zero common mode voltage injection. If the feedforward midpoint current is set to the minimum absolute value ($K_{FF}=1$), the common mode injection will be automatically synthesised, via the $v_0=f(i_{MP})$ map, to the common mode injection needed to bring the midpoint current $i_{MP}$ to the lowest controllable value.

Feedback Control

Figure 7:
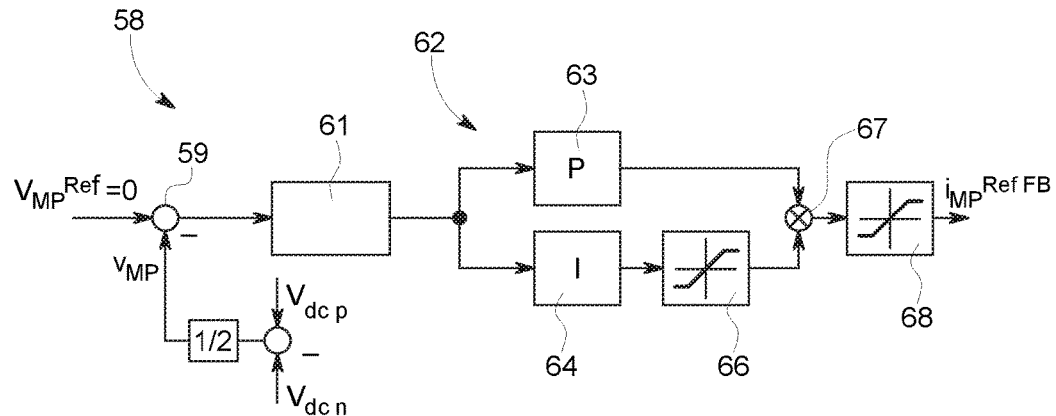
FIG. 7 shows a schematic block diagram of an example feedback control unit for midpoint voltage control for use in the power conversion system of FIG. 3.

FIG. 7 shows a block diagram of a feedback path 58 which can be used by the control units 43, 44 for midpoint voltage control. In an embodiment, the feedback path 58 is used to control the average midpoint voltage drift and is tuned with a low bandwidth for this purpose. In principal, the feedback control 58 could also assist in the midpoint voltage ripple suppression if an increased bandwidth is used, but this is not necessary.

As may be seen in FIG. 7, the detected midpoint voltage signal $v_{MP}$ is subtracted from the midpoint voltage reference set to 0 here, $v_{MP}^{ref}=0$, by a subtraction element 59 and then optionally passed through a low pass filter 61 to remove high frequency noise and attenuate the predominantly $3^{rd}$ harmonic voltage ripple caused by the line-side active front end. In addition, the filtering stage 61 can contain a notch filter tuned at the third harmonic frequency to fully remove the residual voltage ripple. The output signal of low path/notch filter 61 is passed through a proportional-integral (PI) controller 62, which conventionally comprises a proportional (P) path 63 and an integral (I) path 64 with an optional limiting element 66, wherein the signals from the P path 63 and the I path 64 are combined in an element 67 and passed through a limiter 68 to yield the feedback midpoint reference current signal $i_{MP}^{Ref\ FB}$.

External Reference and Total Midpoint Current Reference

Figure 8:
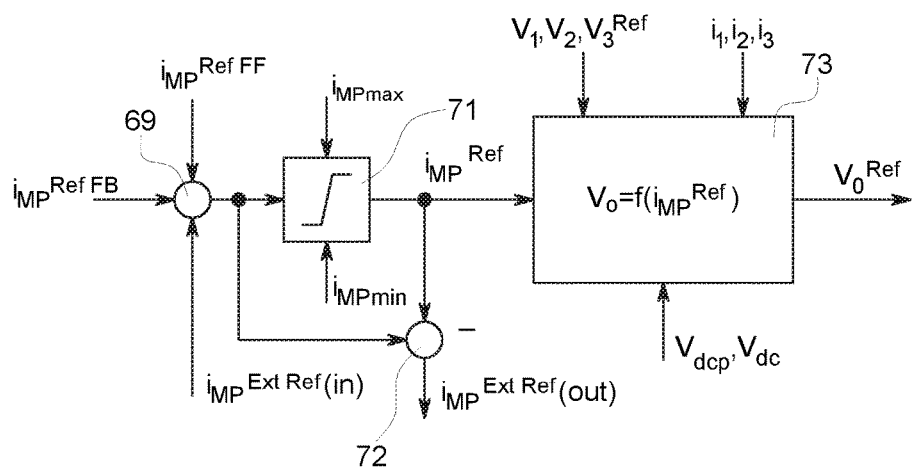
FIG. 8 shows a schematic block diagram of an example control unit for the conversion of the midpoint current reference into the common mode voltage reference for use in the power conversion system of FIG. 3.

In embodiments, and as sown in FIGS. 3 and 8, the midpoint voltage control units 43, 44 may introduce an external midpoint current reference signal $i_{MP}^{Ext\ Ref}$ to allow cross-compensation of the midpoint current. The total midpoint current reference is obtained as a sum of the references $i_{MP}^{Ref\ FF}$ and $i_{MP}^{Ref\ FF}$ provided by the feedforward and feedback controllers in a summation element 69 in FIG. 8. The total midpoint current reference is constrained to stay within a range defined by the maximum and minimum midpoint current limits, $i_{MP\ max}$ and $i_{MP\ min}$, in a limiter unit 71. In this way, the control units 43, 44 may ensure that the resulting common mode reference will not exceed the available modulation margin and will not result in saturation of PPM modulators. The resulting total midpoint current reference is given by the following equation:

$$i_{MP}^{Ref} = LIM(i_{MP}^{Ref\ FB} + i_{MP}^{Ref\ FF} + i_{MP}^{Ext\ Ref}{}_{(in)})$$

The part of the midpoint current reference the injection of which cannot be imposed with the available range of the common mode voltage injections is obtained using a subtractor unit 72 in FIG. 8 and exported to facilitate cross-compensation between the converters 43, 44. This part of the midpoint current reference is generally given by the following equation:

$$i_{MP}^{Ext\ Ref}{}_{(out)} = (i_{MP}^{Ref\ FB} + i_{MP}^{Ref\ FF} + i_{MP}^{Ext\ Ref}{}_{(in)}) - i_{MP}^{Ref}$$

Common Mode Voltage Reference

As may be further seen in FIG. 8, the midpoint current reference $i_{MP}^{Ref}$ is sent to the calculator block 73, which provides the final common mode voltage injection reference $v_0^{Ref}$ based on the pre-calculated map 56 in a particular operational point, $v_0^{Ref} = f(i_{MP})$. At the output of the calculator block 73, which corresponds to the mapping block 56 in FIG. 5, the common mode reference voltage $v_0^{Ref}$ is generated, which is automatically constrained within the available range due to the previous limitation of the current reference. The common mode voltage reference $v_0^{Ref}$ is added to the original converter voltage references $v_{1,2,3\ G}^{Ref}$ and $v_{1,2,3\ M}^{Ref}$ provided by the grid-side and machine-side converter controllers 47 and 48, respectively, in the summation units 52 and 53.

Coordination of Grid- and Machine-Side Converter Controls

For optimal system performance, the control units 49, 51 of the inventive control system 46 may be configured for a coordinated operation and maximization of the midpoint voltage ripple compensation. In the back-to-back converter topologies, as shown in FIG. 3, the average midpoint voltage drift can be, in an embodiment, controlled by the feedback PI control loop 58 as shown in FIG. 7 using only one or both of the converters 43, 44. If both converters 43, 44 are used, the integral control 64 should be enabled only in one of the converters 43, 44.

The feedforward controls can be configured in several different ways. For example, each converter 43, 44 can be controlled to minimize its midpoint current injections by setting in both converters $K_{FF}=1$ and no cross-compensation, i.e. $i_{MP}^{Ext\ Ref}(in)=0$.

In here relevant low speed applications, in an embodiment, the machine-side converter 44 is controlled via the feedforward path to maximize compensation of its own midpoint current (up to its control limits) by setting $K_{FF}=1$ and $i_{MP\ M}^{Ext\ Ref}(in)=0$. The instantaneous value of the uncompensated residual portion of its midpoint current may then be calculated according to the following equation:

$$i_{MP\ M}^{Ext\ Ref}{}_{(out)} = i_{MP\ M\ min\ abs} - i_{MP\ M\ nat}$$

This signal is output via an output 74 (see FIG. 3) of the machine-side midpoint voltage control unit 44, inverted and passed to an input 76 of the grid-side midpoint voltage control unit 43 (FIG. 3) to be used as the external reference $i_{MP\ G}^{Ext\ Ref}$ in the grid-side converter feedforward control:

$$i_{MP\ G}^{Ext\ Ref}{}_{(in)} = -i_{MP\ M}^{Ext\ Ref}{}_{(out)}$$

The grid-side converter 43 may ($K_{FF}=1$) or may not ($K_{FF}=0$) be controlled to control its midpoint current. Since in low frequency applications the midpoint current produced by the grid-side converter is normally negligible compared to that produced by the machine-side converter, typically no feedforward compensation of the grid-side midpoint current ripple is needed, and thus $K_{FF}=0$ may be set. However, the grid-side converter 43 is used for cross-compensation of the midpoint current voltage ripple. For this purpose, the grid-side feedforward controller 49 receives the external midpoint current reference $i_{MP\ G}^{Ext\ Ref}$ determined by the machine-side midpoint voltage control unit 51. Then, based on this reference, the grid-side midpoint voltage control unit 49 further reduces the machine-side midpoint current injection within its control ability. In this way, the machine-side midpoint current compensation is maximized up to the theoretical limits when using both converters 43 and 44 for the compensation.

Figure 9:
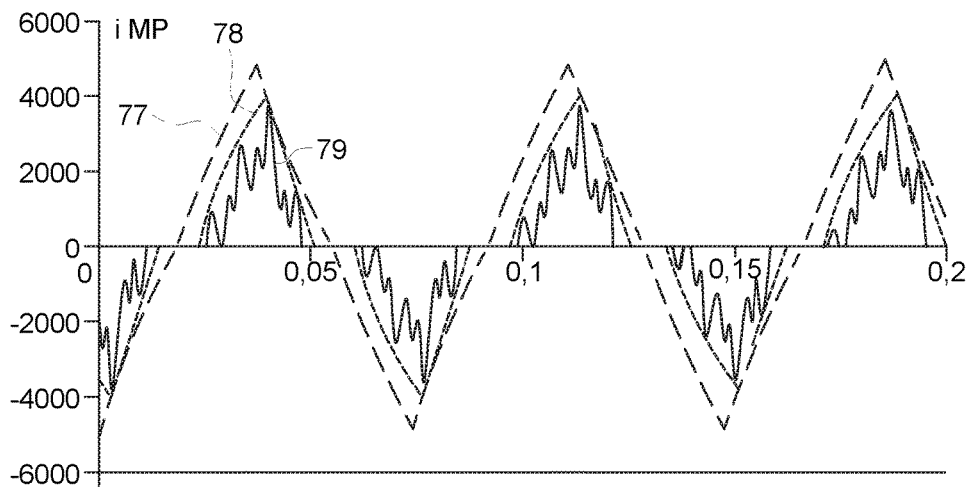
FIG. 9 shows a diagram of the midpoint current produced by the machine-side converter of the power conversion system of FIG. 3, illustrating the neutral and residual midpoint current signals over time.
Figure 10:
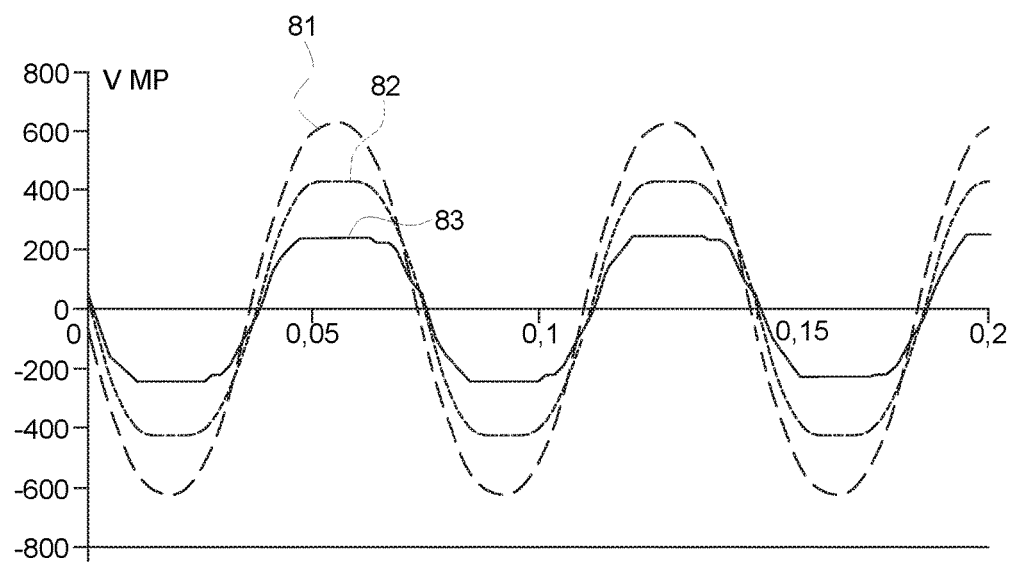
FIG. 10 shows a diagram of midpoint voltage ripple illustrating the neutral and residual voltage ripple signals before and after compensation by the machine-side and the grid-side converters according to an embodiment of present invention.

FIGS. 9 and 10 show signal/time diagrams providing simulation results to illustrate operation of the midpoint voltage control units 49, 51. FIG. 9 illustrates midpoint current waveforms $i_{MP}$ when the machine-side converter 44 operates at 4.5 Hz. Large midpoint voltage variations at 3×4.5 Hz=13.5 Hz produced by the machine-side converter can be observed, while variations at 150 Hz (3×50 Hz of the grid frequency) produced by the grid-side converter 43 are negligible. The original, neutral midpoint current of the machine-side converter 44 without the midpoint voltage control, $i_{MP\ M\ nat}$ (shown with long dashed lines 77 in FIG. 9) is firstly reduced by the machine-side converter to $i_{MP\ M}$ (shown in short dashed line 78). The grid-side converter 43 additionally compensates for the residual machine-side converter midpoint current up to its limit $i_{MP}$ (shown with solid line 79 in FIG. 9).

As a result of the control, and as shown in FIG. 10, original peak value of the corresponding midpoint voltage variations (shown with long dashed line 81 in FIG. 10) is reduced in a particular operational point firstly by the machine-side converter 44 (in the example, to approximately ⅔ of the original value in the simulations), as shown with short dashed line 82 in FIG. 10. When the residual machine-side midpoint current is further compensated by the grid-side converter 43, the peak value of the midpoint voltage ripple may be additionally greatly reduced (in the example, up to approximately ⅓ of the original value in the simulations), as is shown with the solid line 83 in FIG. 10.

Figure 11:
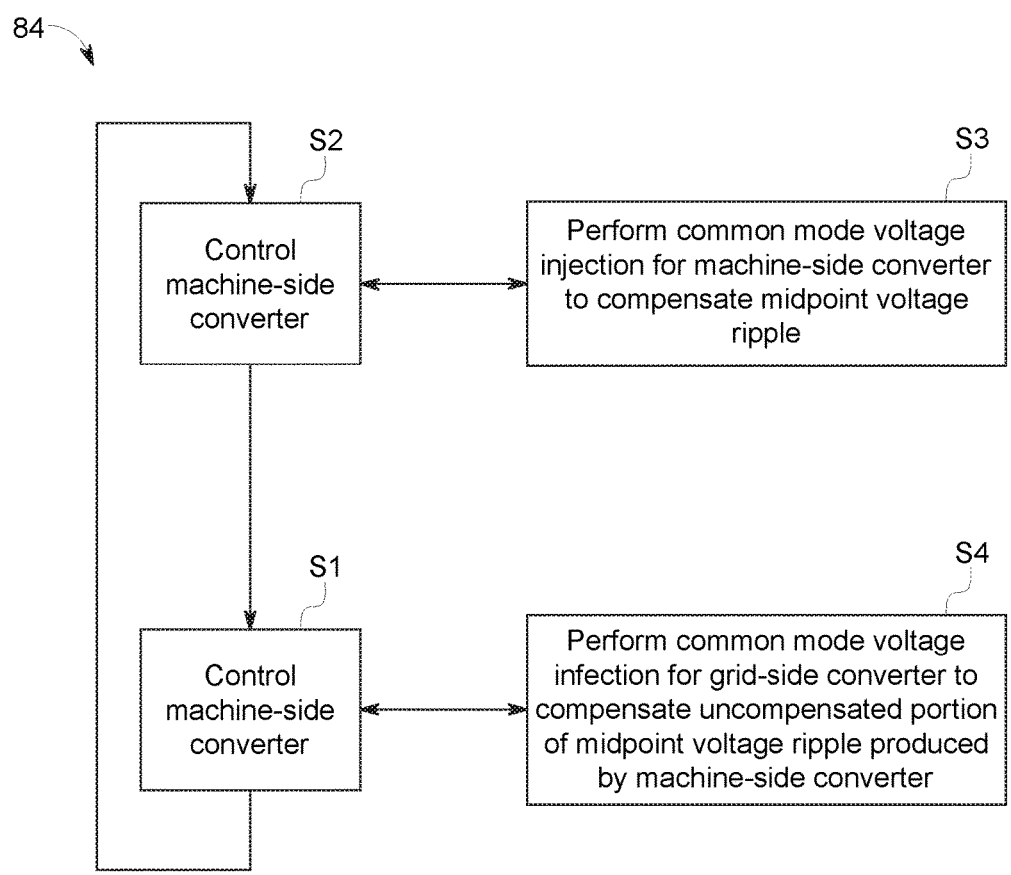
FIG. 11 shows a flow diagram of a method for controlling a back-to-back three-phase three-level converter, in a principle schematic view.

FIG. 11 shows a flow chart of a method 84 for controlling a back-to-back three-phase three-level converter, e.g. the converter 42 of FIG. 3, which has a grid-side AC/DC converter, e.g. 43, and a machine-side DC/AC converter, e.g. 44, connected by a split DC link, e.g. 8, which defines a DC link midpoint 7. The method 84 comprises the step S1 of controlling the grid-side converter to convert AC power from a grid into DC power of the DC link, including a positive, a negative, and a neutral voltage potential, said neutral voltage potential being at the DC link midpoint.

The method further comprises the step S2 of concurrently controlling the machine-side converter to convert DC power from the DC link to AC power to be output to a machine, in particular a low frequency machine.

The method further comprises the step S3 of, while controlling the machine-side converter, performing common mode voltage injection for the machine-side converter so as to at least partially compensate midpoint voltage ripple caused by the machine-side converter.

The method further comprises the step S4 of, while controlling the grid-side converter, performing common mode voltage injection for the grid-side converter to at least partly further compensate an uncompensated portion of the midpoint voltage ripple, which is uncompensated by controlling the machine-side converter in step 3.

Thus, by using the control method, compensation of the midpoint voltage ripple may be maximized through full utilization of available modulation margins of both the grid-side and the machine-side converters. The method is especially effective in low frequency applications where the load-side DC/AC converter is operated at relatively low output frequencies and high modulation indexes.

To perform the common mode voltage injection for the machine-side converter in step S3, the inventive control method may dynamically calculate, in an actual operational point, the neutral converter midpoint current injection, map functional relationship between the midpoint current and common mode voltage injections, and determine limits within which the converter midpoint current injection can be controlled via available range of the common mode voltage injection in the machine-side converter.

In embodiments, the control method may calculate a first part of the midpoint current reference (feedforward control) of the machine-side converter, which is, in an embodiment, minimum practically realizable midpoint current. The midpoint current injection produced by the machine-side converter which will not or cannot be compensated by the machine-side converter may be determined and used as an external reference for the grid-side converter control.

The machine-side control in step S3 may further calculate a second part of reference for the capacitor midpoint current of the machine-side converter using a feedback based control of the predominantly average value of the midpoint voltage.

Further, the machine-side control may calculate composite reference for the capacitor midpoint current for the machine-side converter, limit it to within pre-calculated limits and calculate a reference for the common mode voltage injection for the machine-side converter using the pre-calculated map.

The uncompensated portion of the midpoint current produced by the machine-side converter, which will not or cannot be compensated by controlling the machine-side converter in step S3 may be scaled by a factor between 0-1, inverted in sign and passed to the grid-side control.

The feedback control of the average capacitor midpoint voltage and the feedforward compensation of the midpoint current of the grid-side converter can be both used, if desired. But the grid-side converter is always controlled to perform the supplementary function to assist the machine-side converter in compensating its midpoint current injection which in the herein relevant low frequency applications is dominated by the $3^{rd}$ harmonic of the operational frequency of the machine-side converter.

The grid-side control for performing common mode voltage injection in step S4 may dynamically calculate, in the actual operational point, the neutral converter midpoint current injection, map a functional relationship between the midpoint current and common mode voltage injections, and determine limits within which the converter midpoint current injection can be controlled via available range of the common mode voltage injection in the grid-side converter.

In embodiments, the grid converter control in step S4 may calculate a first part of the midpoint current reference (for feedforward control) of the grid-side converter which is, in an embodiment, set to the neutral midpoint current, such that no self-compensation of the midpoint current injection produced by the grid-side converter is performed.

The control in step S4 may optionally calculate a second part of reference for the capacitor midpoint current of the machine-side converter using a feedback based control of the average value of the common midpoint voltage. If the feedback control is used, the integral part of the feedback controllers should be enabled only in one of the machine- and grid-side converters.

The control in step S4 may further calculate a composite reference for the capacitor midpoint current for the grid-side converter including an external reference passed from the grid-side control in step S3 and may limit the composite reference to stay between pre-calculated limits and then calculate the common mode voltage injection for the grid-side converter using the pre-calculated map.

In embodiments, the control method steps S3 and S4 may provide for a combination of a feedforward midpoint current compensation by control of both the grid- and machine-side converters and a feedback midpoint average voltage drift control of, in an embodiment, one of the converters.

Disclosed is a method for controlling a back-to-back three-phase three-level converter 42 having a grid-side AC/DC converter 43 and a machine-side DC/AC converter 44 connected by a split DC link 8 which defines a DC link midpoint 7. The method comprises controlling the grid-side converter 43 to convert AC power from a grid 39 into DC power of the DC link 8, controlling the machine-side converter 44 to convert DC power from the DC link 8 to AC power to feed a low frequency machine 41, and concurrently performing common mode voltage injection for the machine-side converter 44 so as to at least partially compensate midpoint voltage ripple caused by the machine-side converter 44. The method further comprises performing common mode voltage injection for the grid-side converter 43 so as to at least partly further compensate the portion of the midpoint voltage ripple which remains uncompensated by controlling the machine-side converter 44. A control system 46 implementing the control method 84 and a power conversion system 38 utilizing same are also disclosed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a back-to-back three-phase three-level converter having a grid-side alternating current (AC) to direct current (DC) converter and a machine-side DC/AC converter connected by a split DC link which defines a DC link midpoint, the method comprising:
controlling the grid-side converter to convert AC power from a grid into DC power of the DC link, including a positive, a negative, and a neutral voltage potential, the neutral potential being at the DC link midpoint;

controlling the machine-side converter to convert DC power from the DC link to AC power to be output to a machine, wherein the controlling the machine-side converter is adapted to perform common mode voltage injection for the machine-side converter so as to at least partially compensate midpoint voltage ripple caused by the machine-side converter; and determining a value ($i_{MP}^{Ext\ Ref}$) of the midpoint current which is uncompensated by controlling the machine-side converter, wherein the controlling the grid-side converter is adapted to perform common mode voltage injection for the grid-side converter based on the determined uncompensated value ($i_{MP}^{Ext\ Ref}$) of the midpoint current so as to at least partly further compensate the uncompensated portion of the midpoint current, which is uncompensated by controlling the machine-side converter.

2. The method of claim 1, wherein the back-to-back converter is configured for low frequency applications, wherein the grid-side converter is controlled to operate at a constant grid frequency of 50 Hz or 60 Hz and the machine-side converter is controlled to operate at nearly full modulation depths at nominal frequencies below 10 Hz and wherein the midpoint voltage ripple is dominated by the $3^{rd}$ harmonic component of the operating frequency of the machine-side converter.

3. The method of claim 1, wherein controlling the machine-side converter comprises:

dynamically calculating, in an actual operational point, the natural converter midpoint current injection ($i_{MP\ M\ nat}$);

mapping a functional relationship between the midpoint current and common mode voltage injections ($i_{MP\ M}=f(v_{0\ M}); v_{0\ M}=f(i_{MP\ M})$); and calculating a reference ($i_{MP}^{Ref}$) for the capacitor midpoint current for the machine-side converter for use in its control using the pre-calculated map.

4. The method of claim 1, wherein calculating a reference ($i_{MP}^{Ref}$) for the capacitor midpoint current comprises:

calculating a first part ($i_{MP\ M}^{Ref\ FF}$) of the midpoint current reference of the machine-side converter, which is preferably minimum practically realizable midpoint current and which can be used for feedforward control of the machine-side converter;

optionally calculating a second part ($i_{MP\ M}^{Ref\ FB}$) of reference for the capacitor midpoint current of the machine-side converter for compensating an average value of the midpoint voltage drift preferably using a feedback based control; and calculating a composite reference ($i_{MP\ M}^{Ref}$) for the capacitor midpoint current for the machine-side converter to be used for its control.

5. The method of claim 3, wherein controlling the machine-side converter comprises:

determining limits ($i_{MP\ M\ min}; i_{MP\ M\ max}$) within which the converter midpoint current injection can be controlled via available range of the common mode voltage injection in the machine-side converter;

limiting the reference or the composite reference ($i_{MP\ M}^{Ref}$) for the capacitor midpoint current for the machine-side converter to stay between the pre-calculated limits; and;

calculating reference ($v_{0M}^{Ref}$) for the common mode voltage injection for the machine-side converter based on the limited reference or the composite reference ($i_{MP\ M}^{Ref}$) using the pre-calculated map.

6. The method of claim 1, wherein the uncompensated portion ($i_{MP}^{Ext\ Ref}{}_{(out)}$) of the midpoint current produced by the machine-side converter is scaled by a factor between 0 and 1, inverted in sign and used as external reference ($i_{MP}^{Ext\ Ref}(in)$) for the control of the grid-side converter.

7. The method of claim 1, wherein controlling the grid-side converter comprises:

dynamically calculating, in actual operational point, the natural converter midpoint current injection ($i_{MP\ G\ nat}$);

mapping a functional relationship between the midpoint current and common mode voltage injection ($i_{MP\ G}=f(v_{0\ G}); v_{0\ G}=f(i_{MP\ G})$); and calculating a first part ($i_{MP\ G}^{RefFF}$) of the midpoint current reference for feedforward control of the grid-side converter which is preferably set to the natural midpoint current $n(i_{MP\ nat})$.

8. The method of claim 7, wherein controlling the grid-side converter further comprises:

calculating a second part ($i_{MP\ G}^{RefFB}$) of reference for the capacitor midpoint current of the grid-side converter for compensation of the average value of the common midpoint voltage drift preferably using a feedback based control; and calculating a composite reference ($i_{MP\ G}^{Ref}$) for the capacitor midpoint current for the grid-side converter, including an external reference ($i_{MP\ G}^{Ext\ Ref}(in)$) indicating a scaled uncompensated portion of the midpoint current produced by the machine-side converter, for compensation of the midpoint current produced by the machine-side converter.

9. The method of claim 6, wherein controlling the grid-side converter further comprises:

determining limits ($i_{MP\ G\ min}; i_{MP\ G\ max}$) within which the converter midpoint current injection can be controlled via available range of the common mode voltage injection in the grid-side converter;

limiting the composite reference ($i_{MP\ G}^{Ref}$) to stay between the determined limits ($i_{MP\ G\ min}; i_{MP\ G\ max}$); and calculating the reference ($v_{0G}^{Ref}$) for common mode voltage injection for the grid-side converter based on the limited composite reference ($i_{MP\ G}^{Ref}$) using the pre-calculated map.

10. The method of claim 1, comprising midpoint voltage ripple compensation by feedforward control of the grid-side and machine-side converters and midpoint average voltage drift compensation by feedback control of at least one of the grid-side and machine-side converters.

11. A system for controlling a back-to-back three-phase three-level converter having a grid-side alternating current (AC) to direct current (DC) converter and a machine-side DC/AC converter connected by a split DC link which defines a DC link midpoint, the system comprising:

a first controller for controlling the grid-side converter to convert AC power from a grid into DC power of the DC link, including a positive, a negative, and a neutral voltage potential, the neutral potential being at the DC link midpoint; and a second controller for controlling the machine-side converter to convert DC power from the DC link to AC power to be output to a machine; and at least one control unit configured for:

performing common mode voltage injection for the machine-side converter so as to at least partially compensate midpoint voltage ripple caused by the machine-side converter;

determining a value ($i_{MP}^{Ext\ Ref}$) indicating the portion of the midpoint current which is uncompensated by controlling the machine-side converter; and performing common mode voltage injection for the grid-side converter based on the value ($i_{MP}^{Ext\ Ref}$) so as to at least partly further compensate the portion of the midpoint current, which is uncompensated by controlling the machine-side converter.

12. The system of claim 11, further comprising calculating means for calculating, in an actual operational point, midpoint current, its limits and required midpoint current and common mode voltage injections, and mapping means to provide a functional relationship between the resulting midpoint current and applied common mode voltage injections.

13. The system of claim 11, comprising feedforward control means for controlling at least one of the grid-side and machine-side converters to provide for feedforward compensation of the midpoint current and corresponding voltage ripple.

14. The system of claim 13, further comprising feedback control means for controlling at least one of the grid-side and machine-side converters to provide for feedback compensation of the average midpoint voltage drift and optionally to assist in the midpoint voltage ripple compensation.

15. A power conversion system comprising:

a three-phase three-level grid-side alternating current (AC) to direct current (DC) converter;

a three-phase three-level machine-side DC/AC converter connected to the grid-side converter in a back-to-back configuration;

a split DC link connecting the grid-side and machine-side converters and defining a DC link midpoint; and a controller for controlling operation of the power conversion system, comprising:

a first controller for controlling the grid-side converter to convert AC power from a grid into DC power of the DC link, including a positive, a negative, and a neutral voltage potential, said neutral potential being at the DC link midpoint; and a second controller for controlling the machine-side converter to convert DC power from the DC link to AC power to be output to a machine; and a control unit configured for:

performing common mode voltage injection for the machine-side converter so as to at least partially compensate midpoint current and corresponding voltage ripple caused by the machine-side converter;

determining a value ($i_{MP}^{Ext\ Ref}$(out)) indicating the portion of the midpoint current of the machine side converter which is uncompensated by controlling the machine-side converter; and performing common mode voltage injection for the grid-side converter based on the determined value ($i_{MP}^{Ext\ Ref}$) so as to at least partly further compensate the portion of the midpoint current, which is uncompensated by controlling the machine-side converter.

* * * * *